US012467291B2

(12) United States Patent
Gajendra et al.

(10) Patent No.: US 12,467,291 B2
(45) Date of Patent: Nov. 11, 2025

(54) LATCH WITH HOLD OPEN LEVER

(71) Applicant: INTEVA PRODUCTS, LLC, Troy, MI (US)

(72) Inventors: Harish Gajendra, Bangalore (IN); Donald Michael Perkins, Rochester Hills, MI (US); Carlos Villagrana Noris, Chihuahua (MX); Arun Murthy Murthy, Bangalore (IN)

(73) Assignee: INTEVA PRODUCTS, LLC, Troy, MI (US)

( * ) Notice: Subject to any disclaimer, the term of this patent is extended or adjusted under 35 U.S.C. 154(b) by 48 days.

(21) Appl. No.: 18/241,295

(22) Filed: Sep. 1, 2023

(65) Prior Publication Data

US 2024/0076916 A1 Mar. 7, 2024

(30) Foreign Application Priority Data

Sep. 4, 2022 (IN) ............................ 202211050447

(51) Int. Cl.

*E05B 85/26* (2014.01)
*E05B 81/06* (2014.01)
*E05B 81/14* (2014.01)

(52) U.S. Cl.

CPC .............. *E05B 85/26* (2013.01); *E05B 81/06* (2013.01); *E05B 81/14* (2013.01)

(58) Field of Classification Search

CPC .......... E05B 85/26; E05B 81/06; E05B 81/14; E05B 81/15

(Continued)

(56) References Cited

U.S. PATENT DOCUMENTS 8,757,679 B2 * 6/2014 Torkowski .............. E05B 81/14 292/216
2003/0038485 A1 * 2/2003 Schwaiger .............. E05B 81/14 292/201

(Continued)

FOREIGN PATENT DOCUMENTS

DE 102018101074 A1 * 7/2019 ............. E05B 77/38
DE 102018128420 A1 * 5/2020 ............. E05B 15/04
JP 2022123428 A * 8/2022 ............. E05B 81/06

OTHER PUBLICATIONS

CNIPA Notification of the First Notice to Make Rectification corresponding to CN Application No. 2024050801457180; Issue Date, May 8, 2024.

*Primary Examiner* — Kristina R Fulton
*Assistant Examiner* — James Edward Ignaczewski
(74) *Attorney, Agent, or Firm* — CANTOR COLBURN LLP

(57) ABSTRACT

A latch, including: a claw movably mounted to the latch for movement between an unlatched position and a latched position; a pawl movably mounted to the latch for movement between an engaged position and a disengaged position, wherein the pawl prevents the claw from moving from the latched position to the unlatched position when the pawl is in the engaged position; a hold open lever configured for movement between a first position wherein the hold open lever does not block movement of the pawl and a second position, wherein the hold open lever prevents the pawl from moving from the disengaged position to the engaged position; a gear rotatably mounted to the latch for movement between a first position and a second position, the gear having a cam portion that is configured to engage the pawl and move the pawl to the disengaged position as the gear rotates from the first position to the second position; and a spring for biasing the hold open lever into the second (Continued)

position as the gear is rotated into the second position, the spring being operably coupled to the pawl at one end and the hold open lever at a second end.

18 Claims, 12 Drawing Sheets

(58) Field of Classification Search
USPC .......................................................... 292/216
See application file for complete search history.

(56) References Cited

U.S. PATENT DOCUMENTS

| | | | | |
|---|---|---|---|---|
| 2011/0031765 | A1* | 2/2011 | Vazquez ................. | E05B 85/26<br>292/217 |
| 2012/0292927 | A1* | 11/2012 | Vazquez ................. | B23P 11/00<br>292/200 |
| 2015/0048629 | A1* | 2/2015 | Saravia Terricabras .. | E05C 3/12<br>292/194 |
| 2015/0345190 | A1* | 12/2015 | Dow ....................... | E05B 81/06<br>292/200 |
| 2017/0191289 | A1* | 7/2017 | Perkins ................... | E05B 77/06 |
| 2018/0073284 | A1* | 3/2018 | Im ........................... | E05B 83/18 |

* cited by examiner 10
32
50
23
12
38
28
30
26
19
34
36
27
14

36
27
14
24
20
28
44
30
25
22
19
34
26
18
12
10
32

LATCH WITH HOLD OPEN LEVER

CROSS REFERENCE TO RELATED APPLICATIONS

This application claims priority under 35 U.S.C. § 119 to the following Indian Provisional Patent Application No. 202211050447, filed on Sep. 4, 2022, the entire contents of which are incorporated herein by reference thereto.

TECHNICAL FIELD

Various embodiments of the present invention relate to a latch and more particularly, a vehicle latch.

BACKGROUND

In some applications, latches are required to perform numerous operations within limited confines of an application area of the item they are installed in.

Certain vehicles are equipped with a rear vehicle storage compartment, commonly known as a trunk. The trunk is closed by a deck lid that is hinged to the vehicle body and swings open to provide access to the storage compartment. Similarly, other vehicles are equipped with a lift gate that allows access to the rear of the vehicle through a gate that is hinged at or near the roof line of a vehicle and opens upward. Vehicles may also have door sliding or otherwise that move between an opened and closed position. Each of the deck lid, lift gate or door can be thought of as a movable panel that allows access to an interior of the vehicle or vehicle compartment. Compartment latches, enable each of these types of panels to be secured and closed.

When it is desired to open these panels, it is known to use a remote unlatch mechanism that releases a pawl from engagement with a claw, allowing a striker pin to be removed from the catch (or throat) of the claw. Advantageously, the deck lid, lift gate or door will release from the striker pin and bias away from the striker due to shocks, springs, compressed sealing materials, motors etc. incorporated in or around these panels. However, when the panel does not bias away from the opening either immediately or shortly after actuation of the unlatching mechanism and the remote unlatching mechanism that causes the pawl to be released from engagement with the claw is de-energized. The pawl may be capable of reengaging the claw prior to the panel being opened and thus the panel cannot be opened even though the unlatching mechanism has been activated. When the panel does not automatically bias open upon release of the pawl from the claw, it would be advantageous to maintain the pawl in a released position until such time as the panel can be manually opened.

In some instances and when a vehicle liftgate is slammed closed portions of an associated latch rebound and the claw of the latch is not engaged by a pawl of the latch.

One reason why the latch is rebounding during a slam event, has its origins on the claw, pawl and hold open lever interaction during the closing function, since when the striker gets into the claw, the claw starts rotating at high speed because of the slam energy, and the claw pushes back the pawl with a lot of energy, which makes the component displace enough to allow the hold open lever to engage/activate during the slam event which does not allow the pawl and claw to engage a primary or closed position. For example, when the striker engages the claw with sufficient velocity during a slamming event, the energy of the slamming event is transferred to the claw and then subsequently transferred to the pawl or pawl lever, which accelerates the pawl to displace it enough to allow engagement of the pawl with the hold open lever, thus not allowing the pawl to subsequently engage with the claw to achieve a closed position of the latch system.

Thus, it is also desirable to provide an apparatus, or feature or method of operation that prevents the latch from operating or being positioned in a configuration that is inconsistent with an intended operation of the latch.

SUMMARY OF THE INVENTION

Disclosed is a latch, including: a claw movably mounted to the latch for movement between an unlatched position and a latched position; a pawl movably mounted to the latch for movement between an engaged position and a disengaged position, wherein the pawl prevents the claw from moving from the latched position to the unlatched position when the pawl is in the engaged position; a hold open lever configured for movement between a first position wherein the hold open lever does not block movement of the pawl and a second position, wherein the hold open lever prevents the pawl from moving from the disengaged position to the engaged position; a gear rotatably mounted to the latch for movement between a first position and a second position, the gear having a cam portion that is configured to engage the pawl and move the pawl to the disengaged position as the gear rotates from the first position to the second position; and a spring for biasing the hold open lever into the second position as the gear is rotated into the second position, the spring being operably coupled to the pawl at one end and the hold open lever at a second end.

In addition to one or more of the features described above, or as an alternative to any of the foregoing embodiments, the gear meshingly engages a worm that is rotationally driven by a motor, the motor when actuated rotates the gear via the worm.

In addition to one or more of the features described above, or as an alternative to any of the foregoing embodiments, the hold open lever engages a feature of the cam portion when the hold open lever is in the second position.

In addition to one or more of the features described above, or as an alternative to any of the foregoing embodiments, the gear is spring biased into the first position by a spring.

In addition to one or more of the features described above, or as an alternative to any of the foregoing embodiments, the latch has a housing and the housing includes a hold open stopper portion that engages a portion of the hold open lever that sets a limit of rotation of the hold open lever.

In addition to one or more of the features described above, or as an alternative to any of the foregoing embodiments, the latch has a housing and the latch includes a bumper that is secured to the housing, the bumper contacts the cam portion when the gear is rotated into either the first position or the second position.

In addition to one or more of the features described above, or as an alternative to any of the foregoing embodiments, the claw is spring biased into the unlatched position by a spring.

In addition to one or more of the features described above, or as an alternative to any of the foregoing embodiments, the hold open lever engages a feature of the cam portion when the hold open lever is in the second position.

In addition to one or more of the features described above, or as an alternative to any of the foregoing embodiments, the gear is spring biased into the first position by a spring.

In addition to one or more of the features described above, or as an alternative to any of the foregoing embodiments, the latch has a housing and the housing includes a hold open stopper portion that engages a portion of the hold open lever that sets a limit of rotation of the hold open lever.

In addition to one or more of the features described above, or as an alternative to any of the foregoing embodiments, the latch has a housing and the latch includes a bumper that is secured to the housing, the bumper contacts the cam portion when the gear is rotated into either the first position or the second position.

In addition to one or more of the features described above, or as an alternative to any of the foregoing embodiments, the claw is spring biased into the unlatched position by a spring.

In addition to one or more of the features described above, or as an alternative to any of the foregoing embodiments, the gear is spring biased into the first position by a spring.

In addition to one or more of the features described above, or as an alternative to any of the foregoing embodiments, the latch has a housing and the housing includes a hold open stopper portion that engages a portion of the hold open lever that sets a limit of rotation of the hold open lever.

Also disclosed is a method of disengaging a pawl from engagement with a claw a latch, including: pivotally mounting a claw movably to the latch for movement between an unlatched position and a latched position; pivotally mounting a pawl to the latch for movement between an engaged position and a disengaged position, wherein the pawl prevents the claw from moving from the latched position to the unlatched position when the pawl is in the engaged position; movably mounting a hold open lever to the latch for movement between a first position wherein the hold open lever does not block movement of the pawl and a second position, wherein the hold open lever prevents the pawl from moving from the disengaged position to the engaged position; rotatably mounting a gear to the latch for movement between a first position and a second position, the gear having a cam portion that is configured to engage the pawl and move the pawl to the disengaged position as the gear rotates from the first position to the second position; and biasing the hold open lever into the second position by a spring as the gear is rotated into the second position, the spring being operably coupled to the pawl at one end and the hold open lever at a second end.

In addition to one or more of the features described above, or as an alternative to any of the foregoing embodiments, the gear meshingly engages a worm that is rotationally driven by a motor, the motor when actuated rotates the gear via the worm.

In addition to one or more of the features described above, or as an alternative to any of the foregoing embodiments, the hold open lever engages a feature of the cam portion when the hold open lever is in the second position.

In addition to one or more of the features described above, or as an alternative to any of the foregoing embodiments, the gear is spring biased into the first position by a spring.

In addition to one or more of the features described above, or as an alternative to any of the foregoing embodiments, the latch has a housing and the housing includes a hold open stopper portion that engages a portion of the hold open lever that sets a limit of rotation of the hold open lever.

In addition to one or more of the features described above, or as an alternative to any of the foregoing embodiments, the latch has a housing and the latch includes a bumper that is secured to the housing, the bumper contacts the cam portion when the gear is rotated into either the first position or the second position.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Figure 1A:
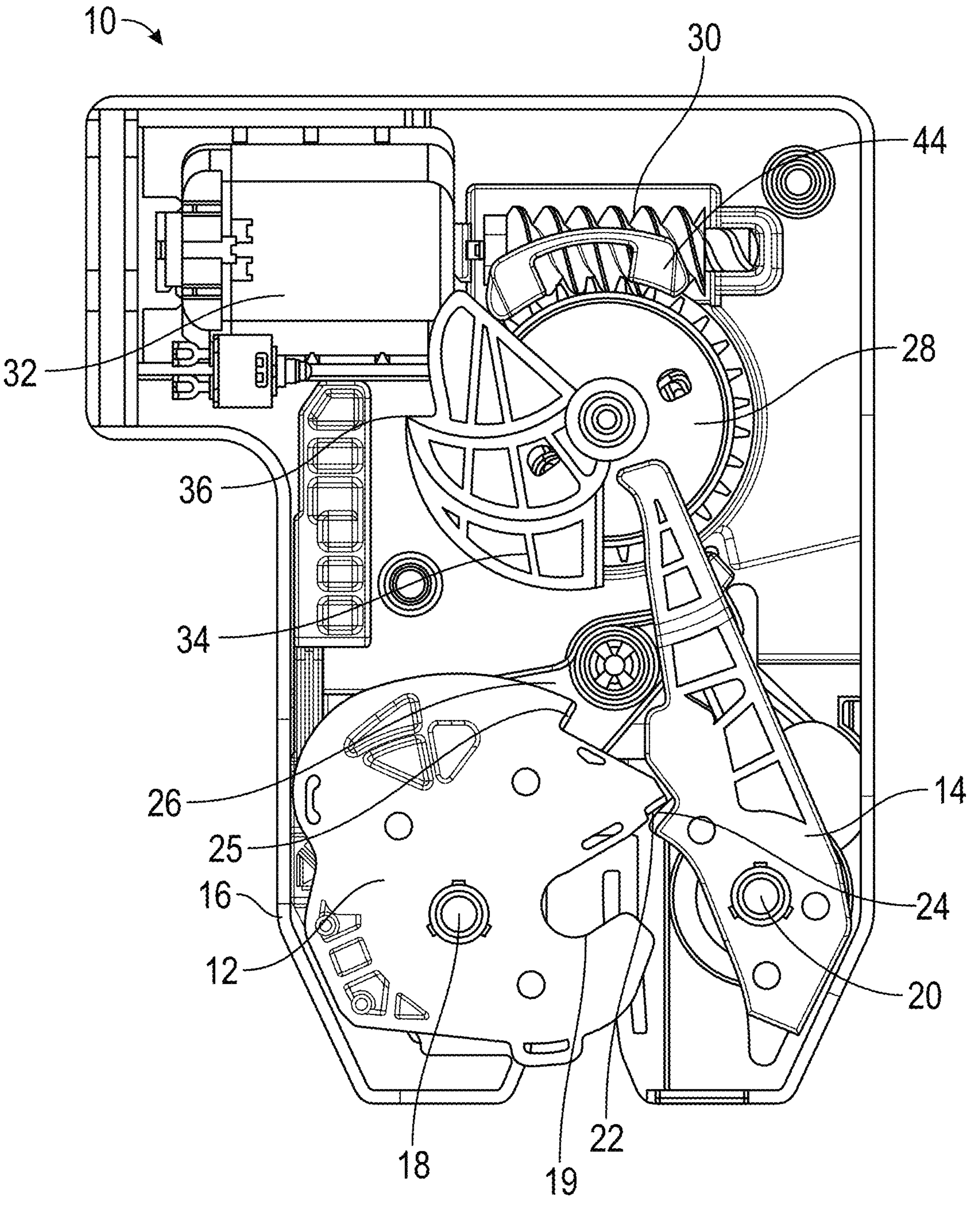
FIG. 1A is a bottom view of portions of a latch in a primary or latched position in accordance with one non-limiting embodiment.
Figure 1B:
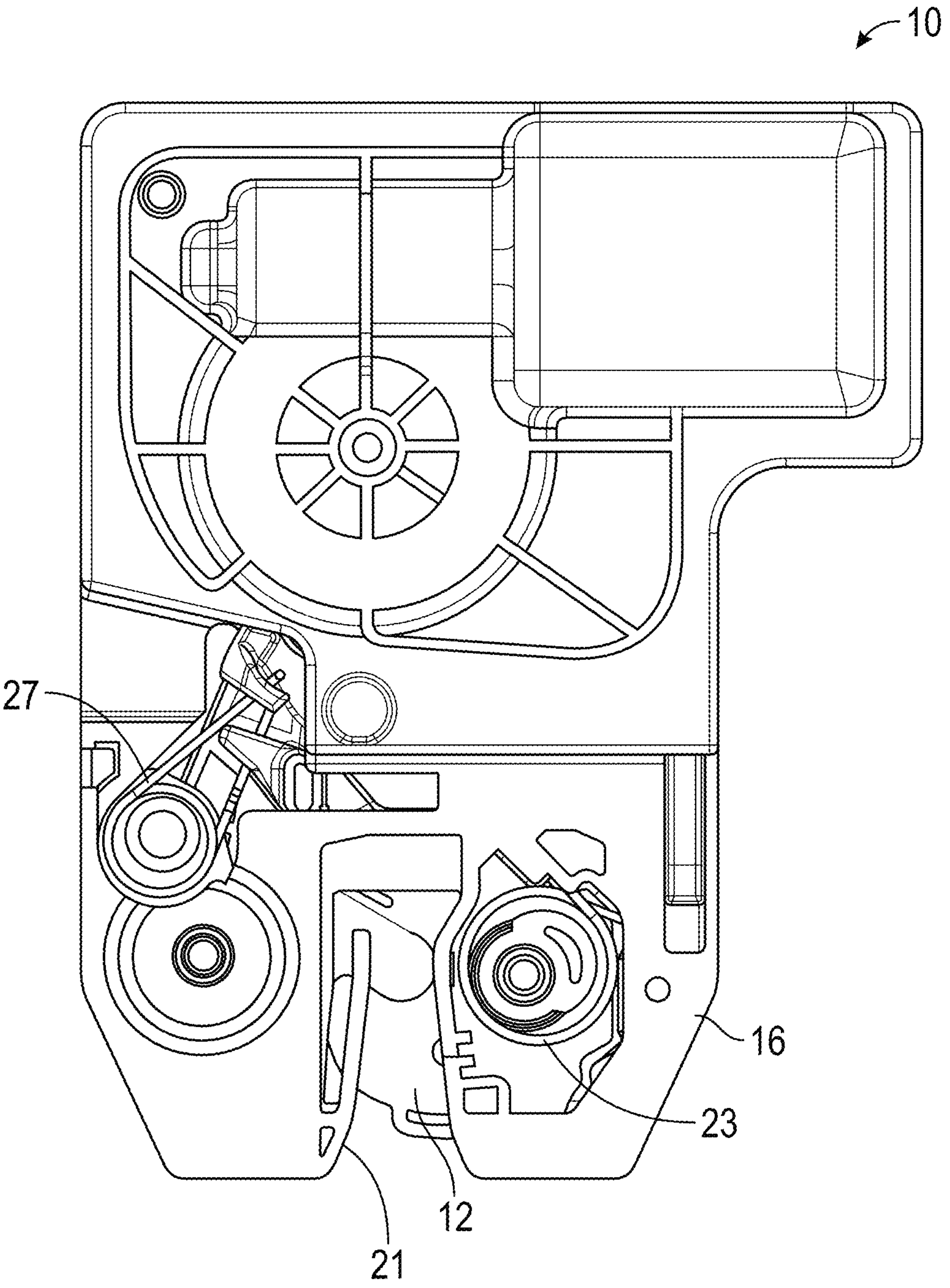
FIG. 1B is a top view of portions of a latch in a primary or latched position in accordance with one non-limiting embodiment.
Figure 1C:
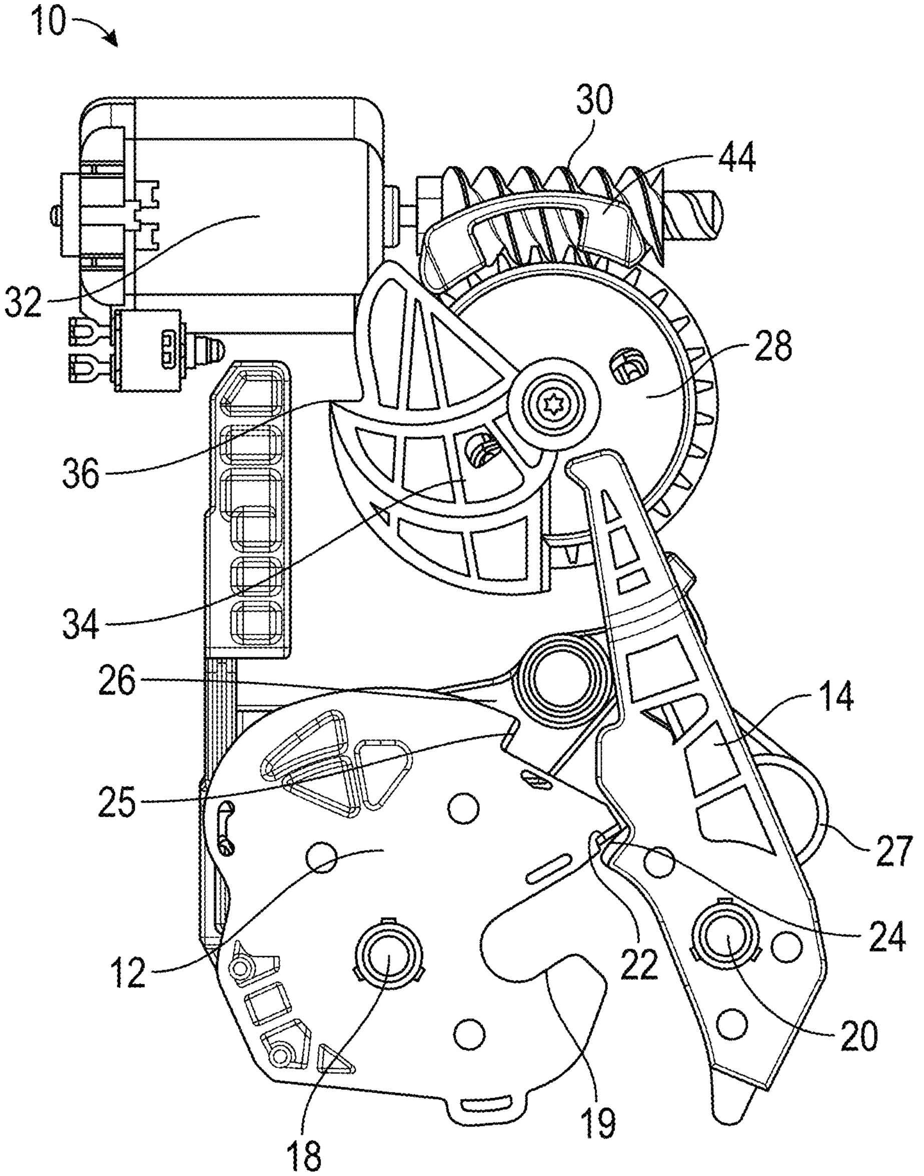
FIG. 1C is a view of the latch in FIG. 1A with certain components removed for ease of illustration.
Figure 1D:
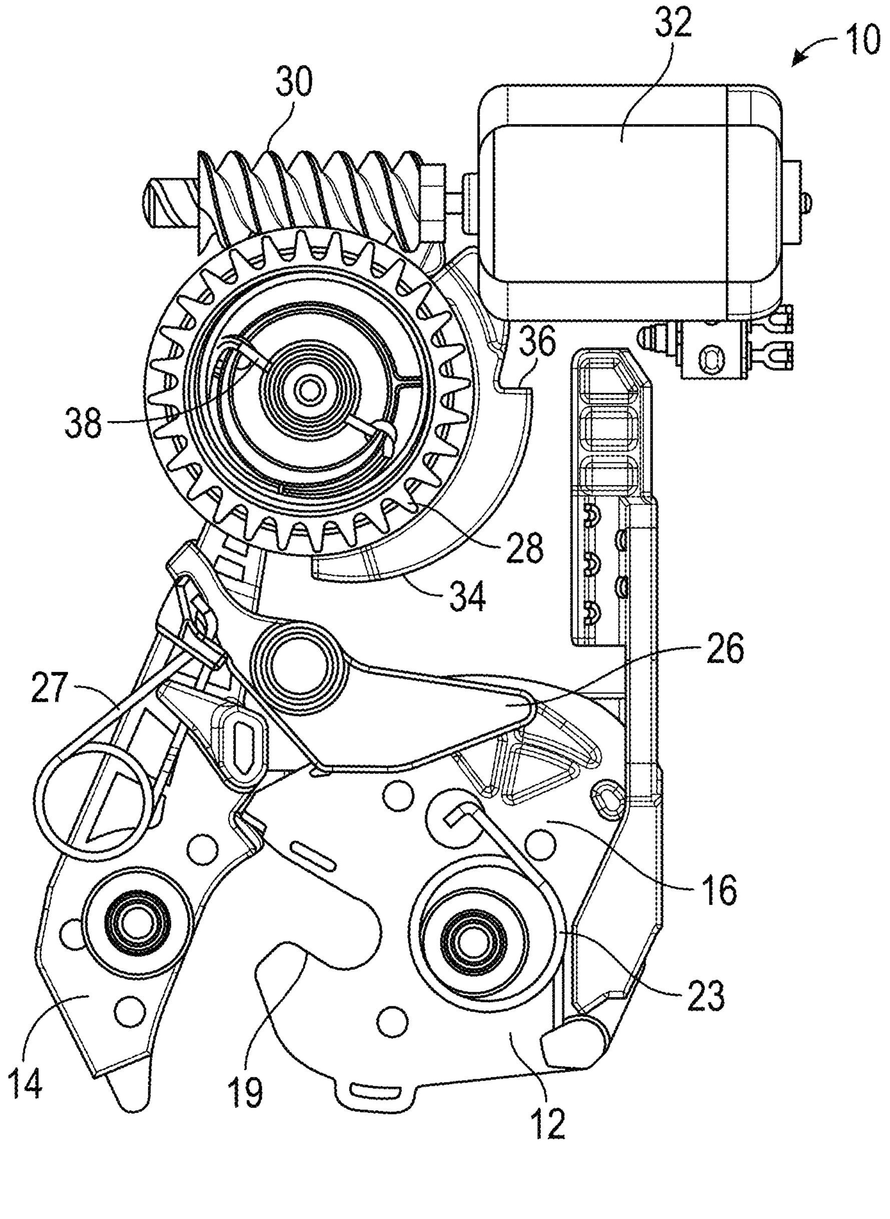
FIG. 1D is a view of the latch in FIG. 1B with certain components removed for ease of illustration.

A detailed description of one or more embodiments of the disclosed apparatus and method are presented herein by way of exemplification and not limitation with reference to the Figures.

As mentioned above, it is desirable to provide certain latches with a means for holding the pawl in a desired position. In particular, one non-limiting design may be incorporated into a rear liftgate latch. This latch with a hold open lever and other components as described herein provides a means for retaining the pawl in an open position or non-engagement position after it has been power released and the door remains in the closed position due to ice buildup or snow or any other force applied to or around the door. In order to provide this feature, the hold open lever is configured to make sure the pawl is held in an open or disengaged position after it has been moved from a closed position or engaged position until the desired operation of the latch occurs.

Still further and as mentioned above and during a slamming event, due to excessive overtravel of the pawl, the pawl may be getting blocked by the hold open lever which in turn allows the claw to rebound without engaging with the pawl. This operation is undesirable. As such, the present disclosure is directed to methods and apparatus for preventing this occurrence.

In accordance with various embodiments of the present disclosure and in order to prevent the aforementioned undesirable situation, the hold open function is detached from the slamming event by a design of the hold open lever and its actuation mechanism in accordance with the present disclosure.

The hold open lever actuates as soon the claw passes through a secondary position to unblock a gear from its rotation and in turn the pawl during the release operation.

Referring now to the FIGS. various embodiments of the invention will be described with reference to specific embodiments, without limiting same, the attached FIGS. shows portions of a latch or latch assembly 10.

In one embodiment, the latch or latch assembly 10 may be a compartment latch. Latch 10 may be configured to keep a trunk lid latched, can keep a lift gate of a vehicle latched or a sliding door of vehicle closed, such as a van door. Still further the latch 10 can be used with any vehicle door or movable component that needs to be latched and unlatched with respect to the vehicle.

As mentioned above, the latch 10 is applicable to any environment where the features of various embodiments of the invention are desired. For example, the latch assembly can be attached to a vehicle structure such that the claw is moved between the open position and the closed position when a hood, door, window, lift gate, etc. is opened and closed and the claw engages a striker that is attached to the hood, door, window, lift gate, etc.

Alternatively, the latch 10 or latch assembly 10 can be secured to the hood, door, window, lift gate, etc. and the striker is secured to the vehicle body at an opening into which the hood, door, window, lift gate, etc. is received.

Latch 10 is located on a first element or first vehicle component which is either a frame (e.g., body member surrounding or proximate to an opening the movable member covers) or movable member (e.g., door, window, lift gate, hood, etc.) and includes a claw 12 and a pawl 14. Each of which may be pivotally or movably mounted to a housing 16 or another portion or other housing portion of the latch 10. In one non-limiting embodiment, the claw 12 is capable of rotation about first stud or pin 18, while pawl 14 is a capable of rotation about a second stud or pin 20. During operation, a striker is attached to a second element or second vehicle component, which is either the frame or movable member depending on which one has the latch 10 secured thereto.

Figure 2A:
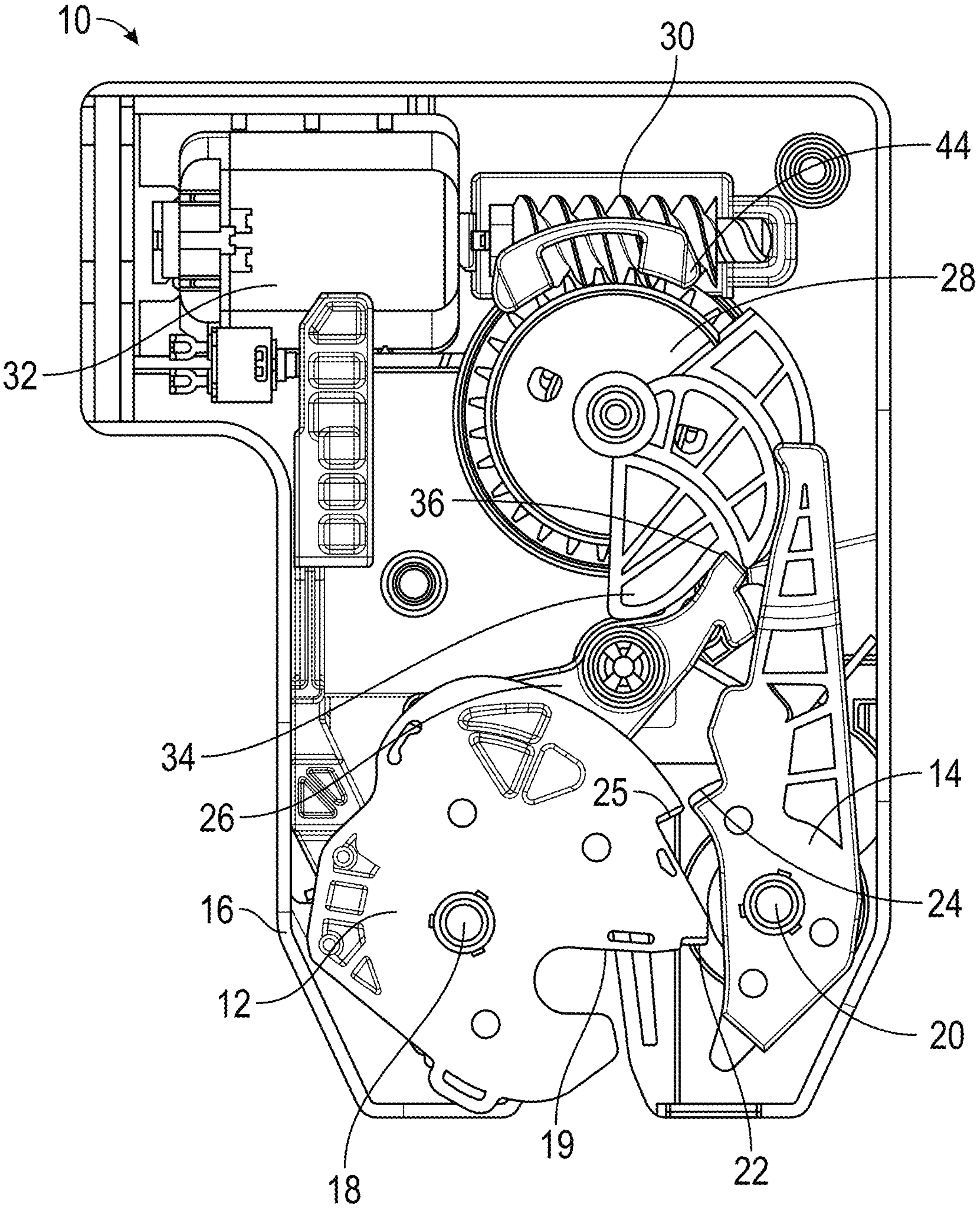
FIG. 2A is a bottom view of portions of a latch where the pawl is disengaged from the claw and the position of a hold open lever is blocked in accordance with one non-limiting embodiment.
Figure 2B:
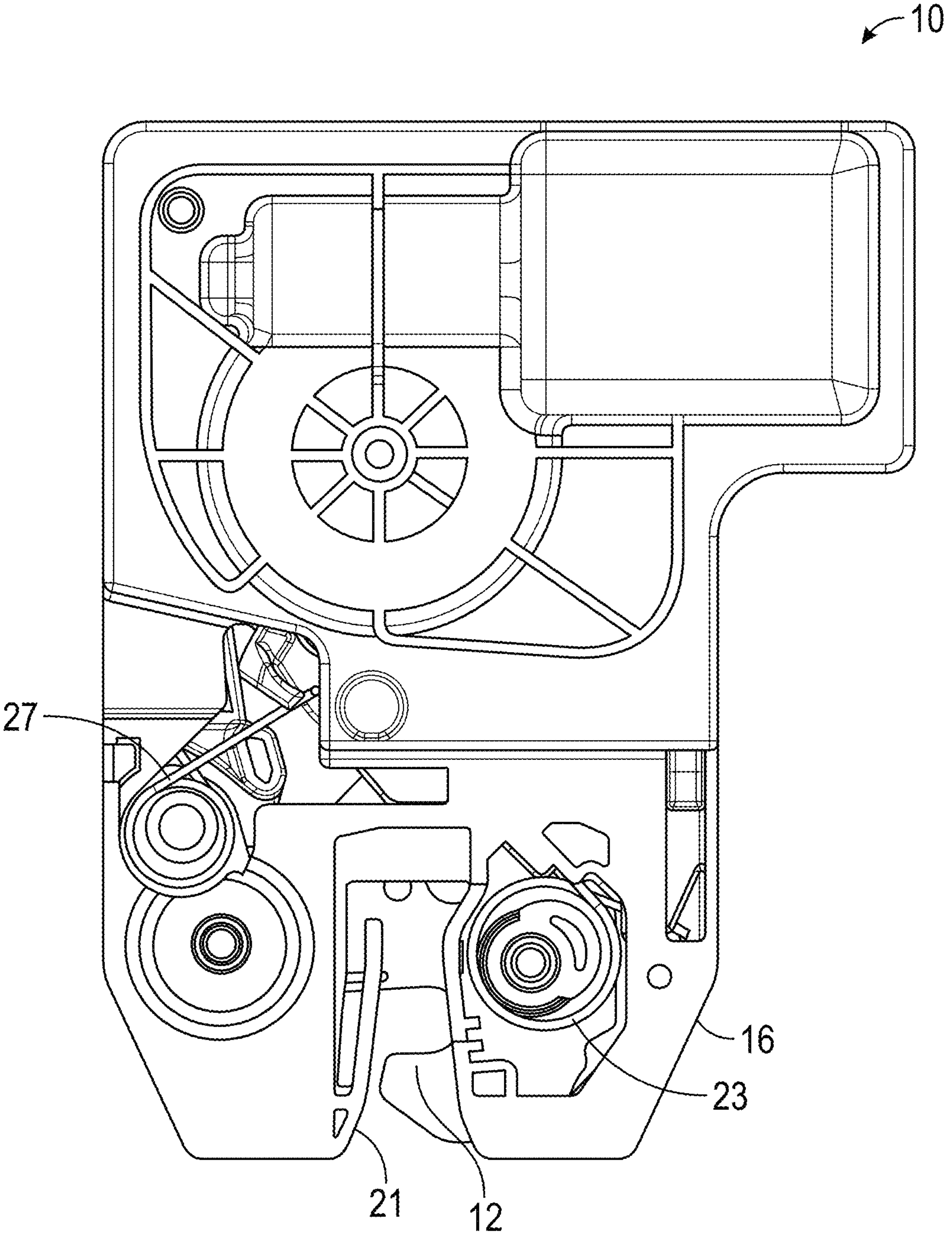
FIG. 2B is a top view of portions of a latch where the pawl is disengaged from the claw and the position of a hold open lever is blocked in accordance with one non-limiting embodiment.
Figures 2C, 2D:
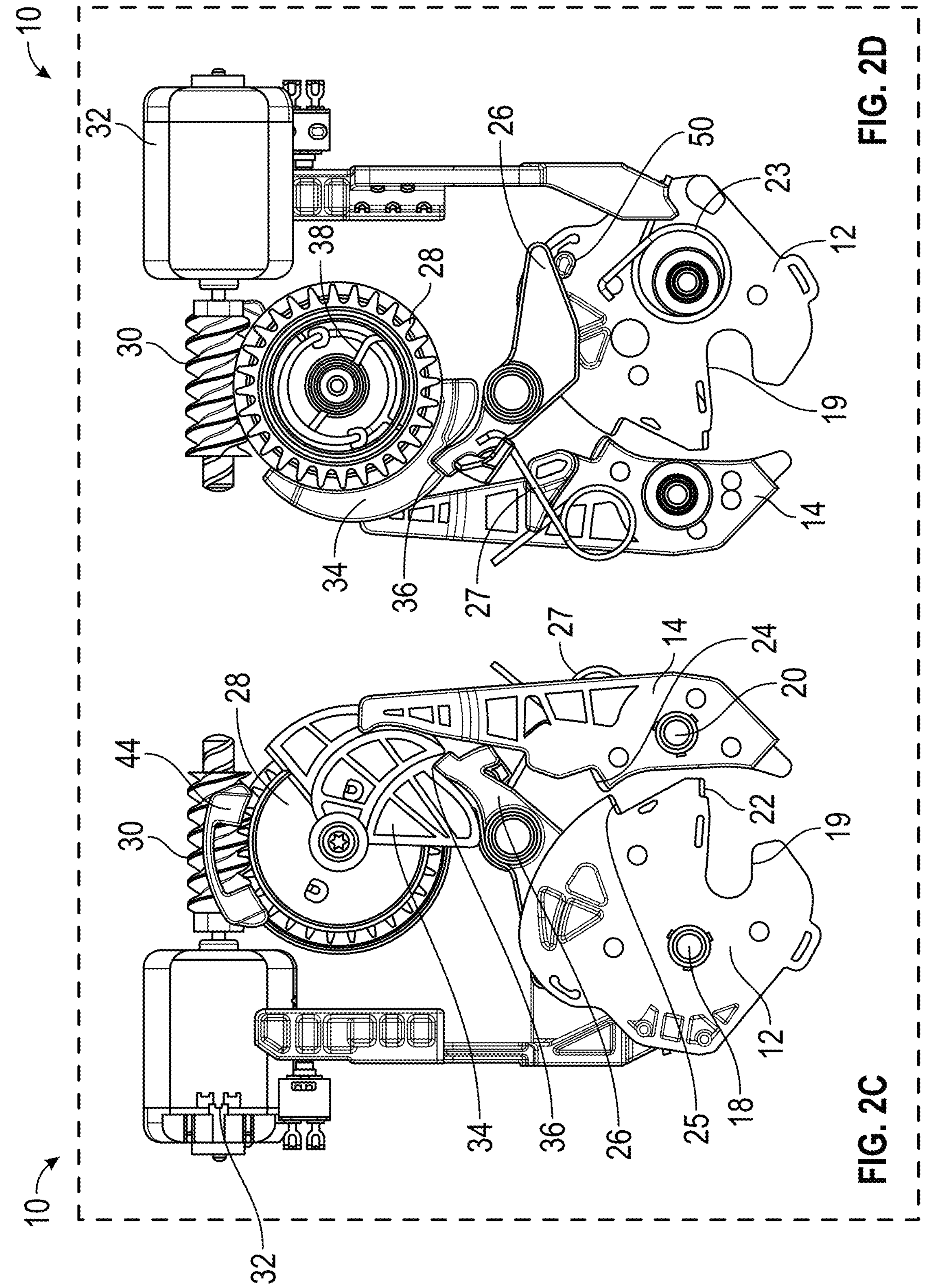
FIG. 2C is a view of the latch in FIG. 2A with certain components removed for ease of illustration.
FIG. 2D is a view of the latch in FIG. 2B with certain components removed for ease of illustration.
Figure 3A:
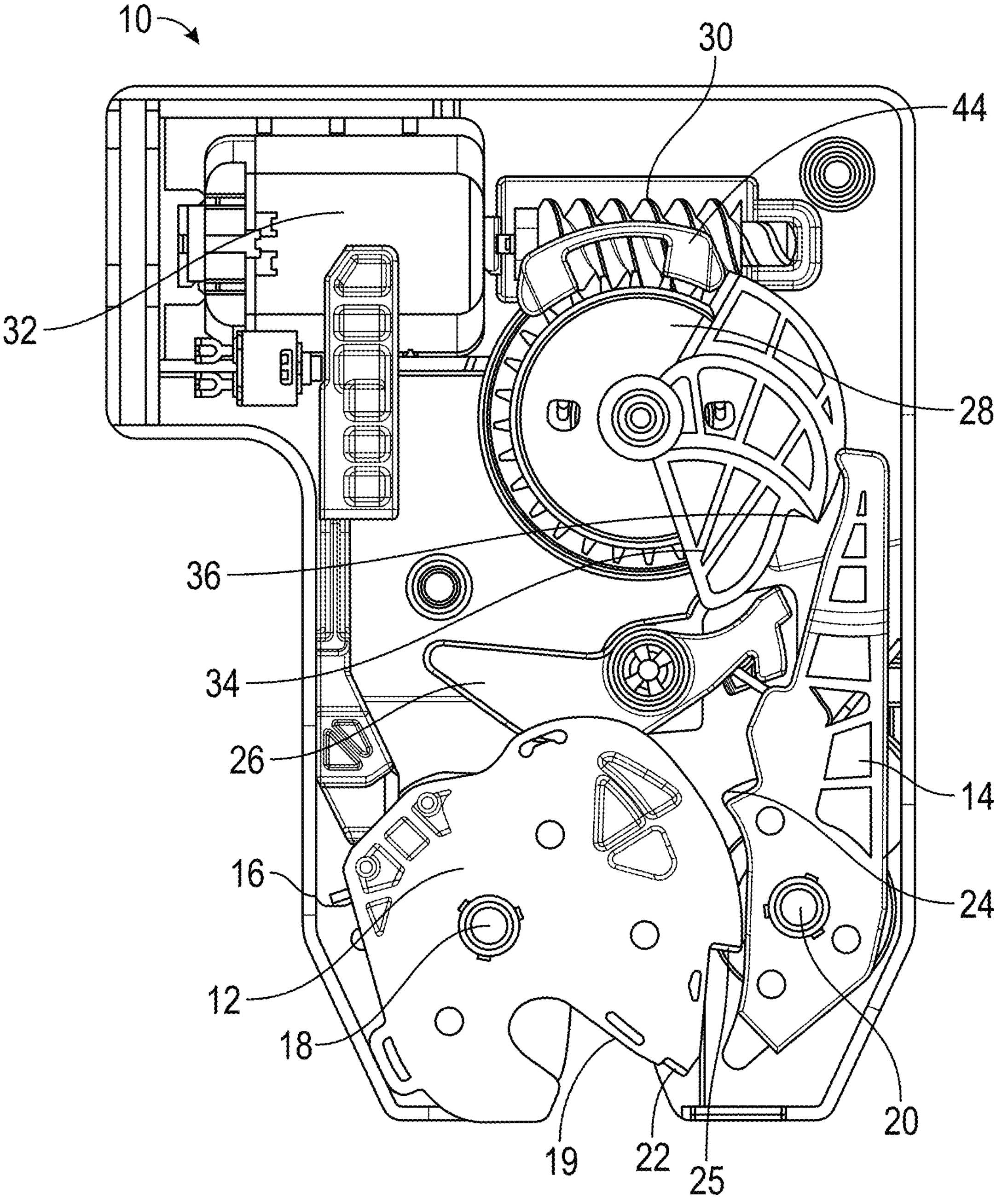
FIG. 3A is a bottom view of portions of a latch where the claw is in an unlatched condition.
Figure 3B:
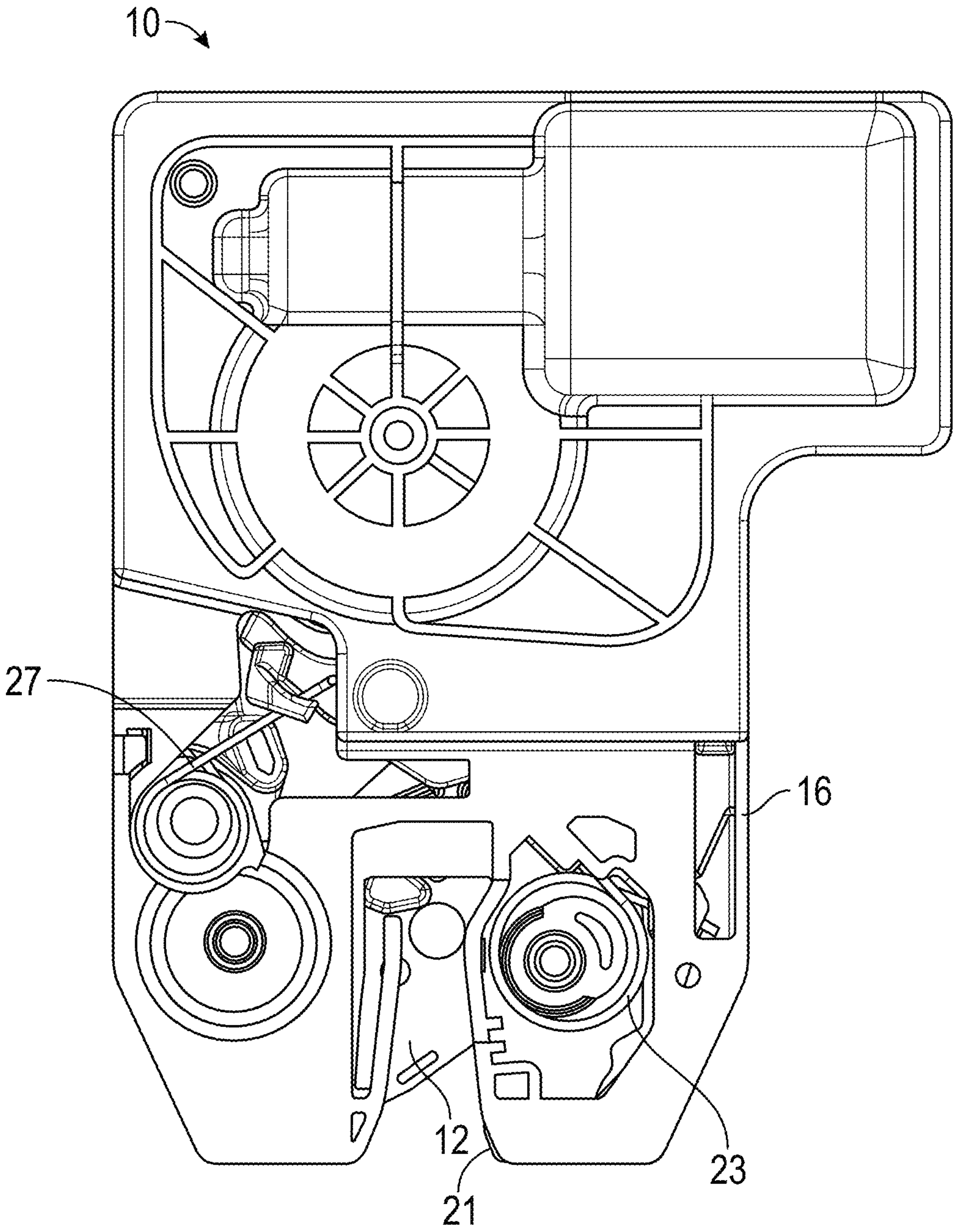
FIG. 3B is a top view of portions of a latch where the claw is in an unlatched condition.
Figures 3C, 3D:
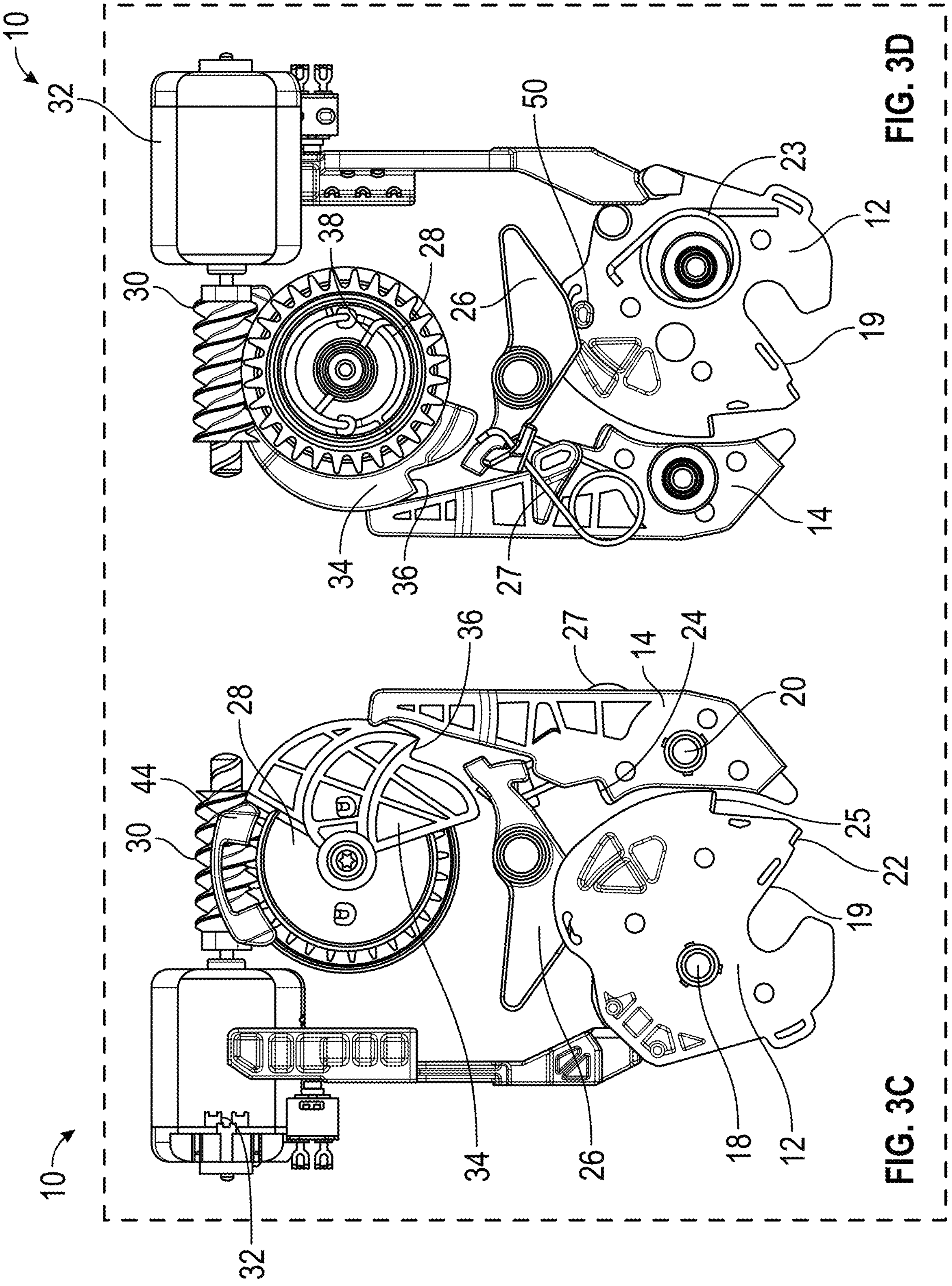
FIG. 3C is a view of the latch in FIG. 3A with certain components removed for ease of illustration.
FIG. 3D is a view of the latch in FIG. 3B with certain components removed for ease of illustration.
Figure 4:
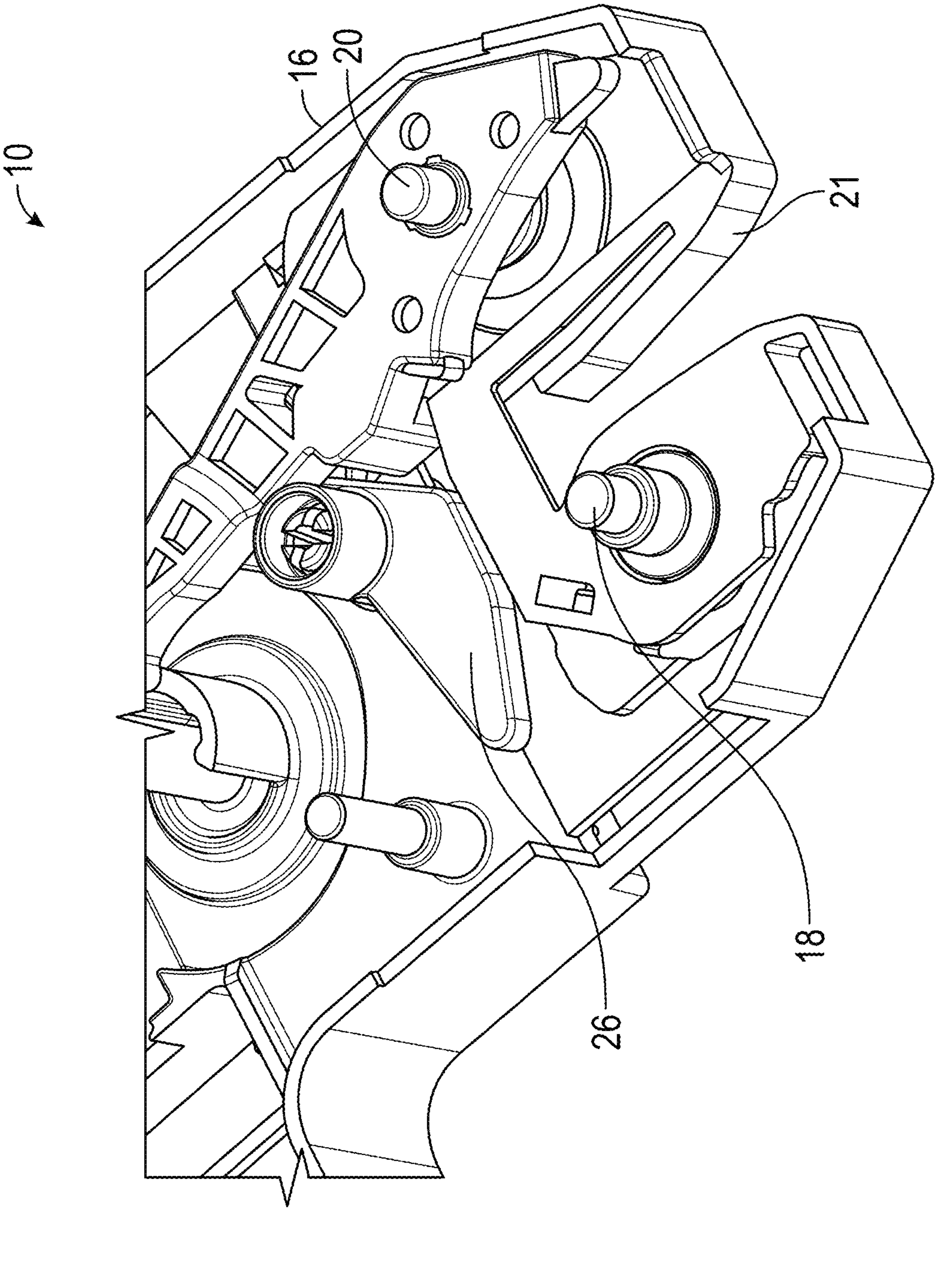
FIG. 4 is a bottom view of portions of a latch in accordance with the present disclosure.

In accordance with an exemplary embodiment, the claw 12 is capable of movement between a first or latched position or closed position (see at least FIGS. 1-2D) wherein the striker is engaged by a throat 19 of the claw and a second or open position or unlatched position (see at least FIGS. 3A-3D) wherein the striker is free to be released from the throat 19 of the claw 12. The housing of the latch 10 will also have a complimentary opening 21 for receipt of the striker therein when it is engaged or latched by the claw. In one non-limiting embodiment, the claw 12 may be spring biased into the second or open position by a spring or biasing member 23.

Alternatively or in addition to the spring biasing force applied to the claw 12, the movable member the striker is secured to may also be spring biased or biased into an open position such that when the latch 10 is released claw 12 will rotate and release striker. One non-limiting example of an item providing such a force is the compressed weather stripping or sealing member located around the periphery of the opening that is covered by the movable member. In other words, when the door is closed, the sealing member is compressed and the latch 10 engages the striker. Thereafter and when the latch 10 is released, the sealing member may provide an urging force to open the door or gate, etc. However and as mentioned above, when a force is applied to the movable member, these biasing forces (spring or otherwise) are not sufficient to move the member into an open position such that the striker is removed from the throat of the claw 12.

During operation and in order to retain the latch 10 or claw 12 in the latched position, the pawl or pawl 14 is pivotally secured to the latch 10 for movement between an engaged position or latched position (see at least FIGS. 1A-1D) and a disengaged position or released position (see at least FIGS. 2A-3D). When the pawl 14 is in the engaged position, a surface 22 of the claw 12 is engaged by a surface 24 of the pawl 14 and the claw 12 is prevented from moving toward the unlatched position from the latched position. In one configuration engagement of surface 22 by surface 24 of the pawl 14 occurs when the claw is in the primary or latched position and the pawl 14 is in the engaged position. In order to provide a secondary latched position the claw 12 may be configured to have a surface 25 that is engaged by surface 24 of the pawl 14 when the claw 12 is a secondary latched position (e.g. between the primary latched position and the open position) and when the pawl is close enough to the engaged position such that surface 24 will be in a position to engage surface 25.

In one non-limiting implementation, a first spring 23 may be provided for biasing the claw into the open position while a second spring 27 may be provided for biasing the pawl in the direction of the engaged position, such that movement of the claw to the latched position will cause the pawl 14 to move to the engaged position. However, should the component the striker is secured to remain closed due to a force acting upon the component, the striker may inadvertently remain in the throat 19 of the claw 12 and unless the claw 12 rotates to the open position, the pawl 14 may move back to the engaged position from the disengaged position thereby preventing rotation of the claw 12 into the open position.

In accordance with exemplary embodiments of the present invention, a hold open feature or lever 26 is movably mounted to the latch 10 for movement between a first position or non-blocking position (see at least FIGS. 1A-1D) and a second position or blocking position (see at least FIGS. 2A-2D). In addition, the latch 10 further comprises a gear 28 rotatably mounted to the housing 16 for movement between a first position (see at least FIGS. 1A-1D) and a second position (see at least FIGS. 3A-3D).

The gear 28 meshingly engages a worm 30 that is rotationally driven by a motor 32. As such and when the worm 30 is rotated by the motor 32, gear 28 rotates. Gear 28 includes a cam portion 34 that is configured to engage the pawl 14 as the gear 28 rotates from the first position to the second position.

When the gear 28 is rotated from the first position illustrated in FIGS. 1A-1D to the second position illustrated in FIGS. 3A-3D, the cam portion 34 contacts the pawl 14 and the pawl 14 is rotated into the disengaged position illustrated in at least FIGS. 3A-3D when the pawl 14 is rotated into the disengaged position the claw 12 can rotate from the primary or latched position (see at least FIGS. 1A-1D) to the open position (see at least FIGS. 3A-3D).

In order to prevent the gear 28 and the pawl 14 from rotating back from the positions illustrated in FIGS. 3A-3D to the positions illustrated in FIGS. 1A-1D until the claw 12 is ultimately rotated back to the position illustrated in FIGS. 1A-1D, the hold open lever 26 engages a feature 36 of the cam portion 34 of the gear 28. As such, the claw 12 is able rotate into the open or unlatched position illustrated in at least FIGS. 3A-3D due to the biasing force of spring 23 while the pawl 14 is held in the disengaged position by the hold open lever.

Figure 5:
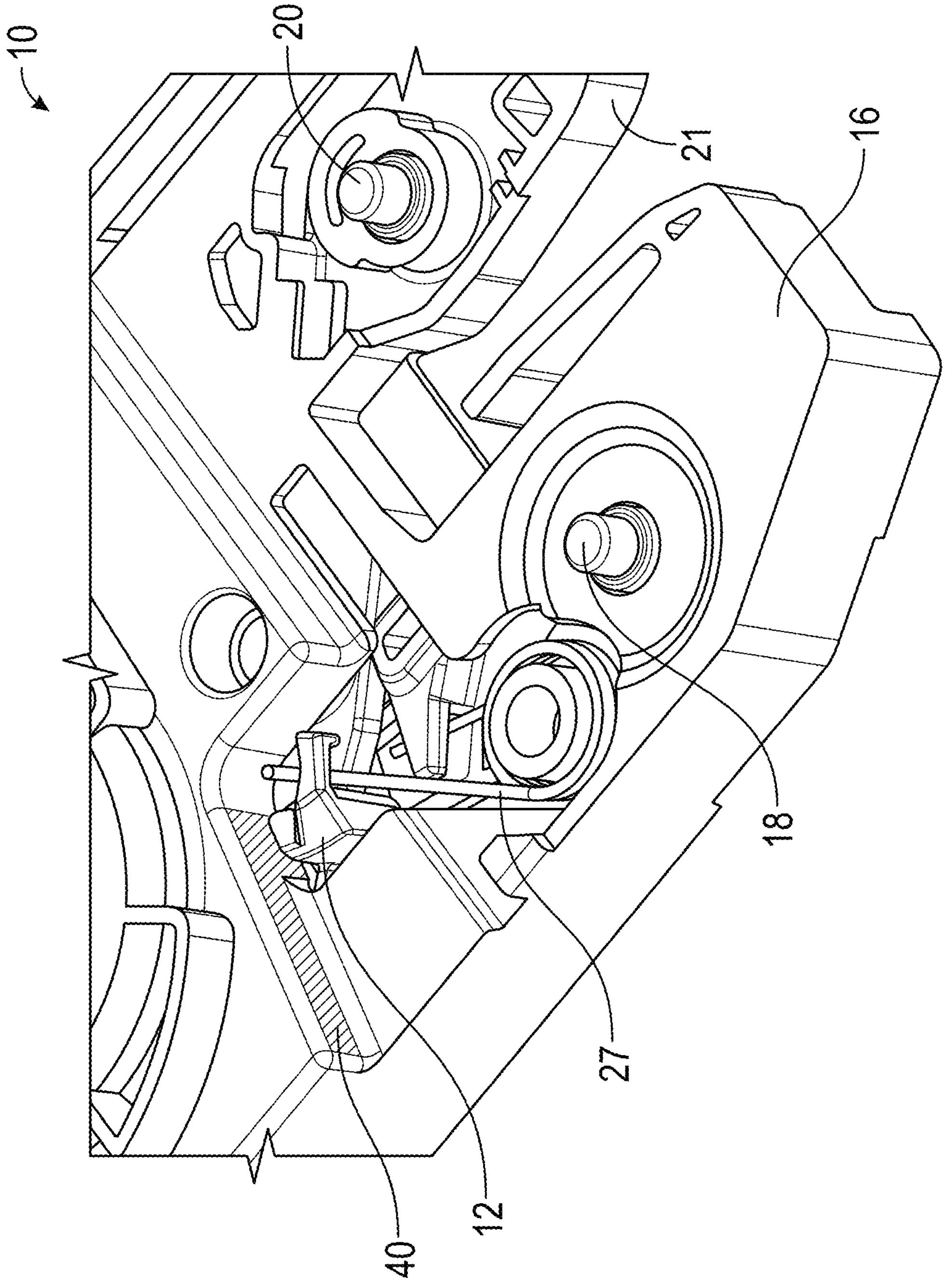
FIG. 5 is a top view of portions of a latch in accordance with the present disclosure.

The gear 28 is spring biased into the first position by a spring 38. The second spring 27 engages the pawl 14 at one end and the hold open lever at the other end. In addition and referring now to at least FIG. 5, the housing 16 includes a hold open stopper portion 40 that engages a portion 42 of the hold open lever that sets a limit of rotation of the hold open lever.

The latch 10 also includes a bumper 44 that is secured to a housing portion of the latch 10. Bumper 44 contacts the cam portion 34 when the gear 28 is rotated into either the first position illustrated in FIGS. 1A-1D or the second position illustrated in FIGS. 3A-3D.

In order to transition the latch 10 from the latched or primary position of FIGS. 1A-1D, the motor 32 is actuated and worm 30 rotates the gear 28 and cam 34 contacts the pawl 14 and rotates the pawl 14 from the engaged position (FIGS. 1A-1D) to the disengaged position (FIGS. 3A-3D) then the claw 12 can rotate from the latched position (FIGS. 1A-1D) to the unlatched position (FIGS. 3A-3D). In order to prevent the pawl 14 from moving back into a engaged position with the claw 12 prior to it rotating into the open position, the hold open lever engages feature 36 of the cam 34 in order to prevent rotation of gear 28 back to the first position. See at least FIGS. 2A-2D. This allows the claw 12 to rotate into the open position prior to it being re-engaged by the pawl 14.

Once the claw 12 is in the open position (see at least FIGS. 3A-3D) the hold open lever 26 is moved back to the first position such that is no longer prevents rotation of the pawl 14 from the disengaged position to the engaged position (see at least FIGS. 1A-1D). In other words, when the claw 12 rotates from the closed position to the open position, a peg or feature 50 of the claw 12, lifts or moves the hold open lever 26 from blocked position and the gear 28 and pawl 14 are free to move back to an initial position.

Accordingly, and in the present disclosure, hold open function is achieved through blockage of gear 28, in-turn pawl 14 blockage occurs. This blockage of the latch 10 or the hold open function of the latch 10 only occurs during a power release event. As such and during slamming event (e.g., door closing event where striker is slammed into the claw 12 and the energy of the slamming event is transferred to the claw and then subsequently transferred to the pawl or pawl lever 14) the gear 28 is in a home position and the hold open lever 26 doesn't engage with any feature of gear 28. Therefore, the hold open function is insulated from a slamming event.

As used herein, the terms "first," "second," and the like, herein do not denote any order, quantity, or importance, but rather are used to distinguish one element from another, and the terms "a" and "an" herein do not denote a limitation of quantity, but rather denote the presence of at least one of the referenced item. In addition, it is noted that the terms "bottom" and "top" are used herein, unless otherwise noted, merely for convenience of description, and are not limited to any one position or spatial orientation.

The modifier "about" used in connection with a quantity is inclusive of the stated value and has the meaning dictated by the context (e.g., includes the degree of error associated with measurement of the particular quantity).

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

What is claimed is:

1. A latch, comprising:

a claw movably mounted to the latch for movement between an unlatched position and a latched position;

a pawl movably mounted to the latch for movement between an engaged position and a disengaged position, wherein the pawl prevents the claw from moving from the latched position to the unlatched position when the pawl is in the engaged position;

a hold open lever configured for movement between a first position wherein the hold open lever does not block movement of the pawl and a second position, wherein the hold open lever prevents the pawl from moving from the disengaged position to the engaged position;

a gear rotatably mounted to the latch for movement between a first position and a second position, the gear having a cam portion having a first portion that is configured to contact the pawl and move the pawl to the disengaged position as the gear rotates from the first position to the second position and the hold open lever contacts a second portion of the cam portion when the hold open lever is in the second position in order to prevent the gear from rotating from the second position to the first position; and a spring for biasing the hold open lever into the second position as the gear is rotated into the second position, the spring being operably coupled to the pawl at one end and the hold open lever at a second end.

2. The latch as in claim 1, wherein the gear meshingly engages a worm that is rotationally driven by a motor, the motor when actuated rotates the gear via the worm.

3. The latch as in claim 1, wherein the gear is spring biased into the first position by a spring.

4. The latch as in claim 1, wherein the latch has a housing and the housing includes a hold open stopper portion that engages a portion of the hold open lever that sets a limit of rotation of the hold open lever.

5. The latch as in claim 1, wherein the latch has a housing and the latch includes a bumper that is secured to the housing, the bumper contacts the cam portion when the gear is rotated into either the first position or the second position.

6. The latch as in claim 1, wherein the claw is spring biased into the unlatched position by a spring.

7. The latch as in claim 2, wherein the gear is spring biased into the first position by a spring.

8. The latch as in claim 7, wherein the latch has a housing and the housing includes a hold open stopper portion that engages a portion of the hold open lever that sets a limit of rotation of the hold open lever.

9. The latch as in claim 8, wherein the latch has a housing and the latch includes a bumper that is secured to the housing, the bumper contacts the cam portion when the gear is rotated into either the first position or the second position.

10. The latch as in claim 9, wherein the claw is spring biased into the unlatched position by a spring.

11. The latch as in claim 3, wherein the latch has a housing and the housing includes a hold open stopper portion that engages a portion of the hold open lever that sets a limit of rotation of the hold open lever.

12. A method of disengaging a pawl from engagement with a claw a latch, comprising:

pivotally mounting a claw movably to the latch for movement between an unlatched position and a latched position;

pivotally mounting a pawl to the latch for movement between an engaged position and a disengaged position, wherein the pawl prevents the claw from moving from the latched position to the unlatched position when the pawl is in the engaged position;

movably mounting a hold open lever to the latch for movement between a first position wherein the hold open lever does not block movement of the pawl and a second position, wherein the hold open lever prevents the pawl from moving from the disengaged position to the engaged position;

rotatably mounting a gear to the latch for movement between a first position and a second position, the gear having a cam portion having a first portion that is configured to contact the pawl and move the pawl to the disengaged position as the gear rotates from the first position to the second position and the hold open lever contacts a second portion of the cam portion when the hold open lever is in the second position in order to prevent the gear from rotating from the second position to the first position; and biasing the hold open lever into the second position by a spring as the gear is rotated into the second position, the spring being operably coupled to the pawl at one end and the hold open lever at a second end.

13. The method as in claim 12, wherein the gear meshingly engages a worm that is rotationally driven by a motor, the motor when actuated rotates the gear via the worm.

14. The method as in claim 12, wherein the gear is spring biased into the first position by a spring.

15. The method as in claim 12, wherein the latch has a housing and the housing includes a hold open stopper portion that engages a portion of the hold open lever that sets a limit of rotation of the hold open lever.

16. The method as in claim 12, wherein the latch has a housing and the latch includes a bumper that is secured to the housing, the bumper contacts the cam portion when the gear is rotated into either the first position or the second position.

17. The method as in claim 12, wherein the hold open lever only contacts the second portion of the cam portion when the hold open lever is in the second position only after a power release of the latch.

18. The latch as in claim 1, wherein the hold open lever only contacts the second portion of the cam portion when the hold open lever is in the second position only after a power release of the latch.

* * * * *